United States Patent [19]
Kim

[11] Patent Number: 6,055,272
[45] Date of Patent: Apr. 25, 2000

[54] RUN LENGTH ENCODER

[75] Inventor: Jong-Han Kim, Seoul, Rep. of Korea

[73] Assignee: Daewoo Electronics Co., Ltd., Seoul, Rep. of Korea

[21] Appl. No.: 08/874,628

[22] Filed: Jun. 13, 1997

[30]     Foreign Application Priority Data

Jun. 14, 1996 [KR] Rep. of Korea ...................... 96-21449
Jun. 14, 1996 [KR] Rep. of Korea ...................... 96-21450

[51] Int. Cl.[7] ................................ H04B 1/66; H04N 7/12; G06K 9/36
[52] U.S. Cl. ........................ 375/240; 348/410; 348/420; 375/246; 375/253; 382/245; 382/246
[58] Field of Search ..................... 348/405, 420, 348/410; 358/261.1, 261.2, 261.3, 261.4; 382/244, 246; 375/245, 246, 253

[56]           References Cited
          U.S. PATENT DOCUMENTS

| | | | |
|---|---|---|---|
| 4,626,829 | 12/1986 | Hauck | 340/347 |
| 5,589,829 | 12/1996 | Astle | 341/67 |
| 5,701,364 | 12/1997 | Kanno | 382/176 |
| 5,764,357 | 6/1998 | Dockser | 358/262.1 |

*Primary Examiner*—Vu Le
*Attorney, Agent, or Firm*—Pillsbury Madison & Sutro LLP

[57]           ABSTRACT

A run length encoder for encoding DCT coefficients obtained in a DCT, a quantization, and a scanning steps in block units to output an encoded (run, level) symbol, and outputting a predetermined (run, level) symbol if the obtained DCT coefficients of the block unit are all zero, comprises a run length encoding core for receiving the DCT coefficients and outputting the (run, level) symbol; a zero coefficient detector for detecting whether the DCT coefficients are '0' or not; a zero block detector for receiving an output from the zero coefficient detector to detect whether all of the DCT coefficients of each block are '0' or not; and an output selector for selecting the 2-dimensional symbol outputted from the run length encoding core to output a (run, level) symbol or a predetermined (run, level) symbol, if the block determined in the zero block detector is non-zero or zero block, respectively.

2 Claims, 5 Drawing Sheets

RUN LENGTH ENCODER

BACKGROUND OF THE INVENTION

1. Field of the Invention

The present invention relates to a run length encoder for compressing and encoding video data, and more particularly to a run length encoder for outputting a (run, level) symbol when detecting a block in which all of its Discrete Cosine Transform (DCT) coefficients are zero.

2. Description of the Prior Art

In general, as the amount of information increases, and a bandwidth for transmitting the information becomes limited, there is a prevalent need for a better data compression technique in video image data transmission. Particularly, since the amount of data in a digital video signal is enormous, its data compression is necessary for efficient storage, search, and transmission.

Accordingly, there have been developed techniques for compressing video data, which remove redundancies contained in video image signals. Known techniques such as an intra frame coding and an inter frame coding remove the spatial redundancy within still image and the temporal redundancy between adjacent video frames, respectively.

Such intra frame coding comprises a DCT and a quantization steps. The inter frame coding comprises a motion estimation/compensation coding for estimating and compensating a motion between two adjacent pictures.

In addition, an entropy coding, which codes quantized DCT coefficient values, removes the statistical redundancies. This entropy coding method comprises a Run Length Coding (RLC), a Variable Length Coding (VLC), and a Bit Plane Coding (BPC). Of these entropy coding methods, the RLC and VLC are most widely used.

Here, the RLC is commonly used to increase a data compression ratio of the transform coding such as DCT. The DCT coefficients have energy distribution in which the energy is concentrated in low frequency coefficients rather than high frequency coefficients having almost '0' value. When quantized DCT coefficients are scanned in the zigzag order to be arranged from the low to the high frequency coefficients, a long 1-dimensional stream of '0's is formed. The RLC outputs a 2-dimensional symbol, (run, level) formed by the number of consecutive '0's and the succeeding non-zero coefficient in the data stream generated by the zigzag scanning.

Another entropy coding method, VLC, compresses a data by minimizing a bit generation ratio such that less bits are assigned to the frequent symbol and more bits are assigned to the rare symbol according to a statistical distribution of the coded symbols. The VLC comprises various types, however, a Huffman coding is commonly used.

FIG. 1 shows a schematic block diagram of a conventional video encoder which is used in a standard encoder such as H.261, MPEG-1, and MPEG-2. A DCT unit 1 processes pixels to remove redundancies between respective pixels within intra frame in 8×8 pixel block units, thereby obtaining DCT coefficients. A quantizer 2 quantizes the DCT coefficients to output in quantization step size. A zigzag scanning unit 3 processes the quantized DCT coefficients to yield 1-dimensional data stream to be outputted to a RLC unit 4. The RLC unit 4 codes the 1-dimensional data stream. A VLC unit 5 then codes the coded 1-dimensional data stream from the RLC unit 4 in accordance with the Huffman table, and the obtained result is outputted to a buffer (not shown).

At this moment, the RLC unit 4 outputs a DC size and a DC difference when the input data are Intra DC coefficients, whereas it outputs the 2-dimensional symbol, (run, level) comprising the number of consecutive '0's and the succeeding non-zero coefficient when the input data are non-Intra DC coefficients.

In the RLC unit 4, a zero-run and a level value are represented as a 2-dimensional symbol, a (run, level). For example, the zigzag scanned DCT coefficients such as (30, 2, 0, 0, -8, 0, 0, 0, 9 . . . ) are coded to obtain 2-dimensional symbols such as (0, 30), (0, 2), (2, -8), (3, 9) . . . In addition, when all of the zigzag scanned coefficients are zero from a predetermined location to the end of a block, an end of block (EOB) code is added to the corresponding location.

In the zigzag scanning unit 3, a coded block pattern (cbp) signal for representing whether each block within a macro block is coded or skipped is generated and outputted to the VLC unit 5. Accordingly, in the VLC unit 5, and the block in which all of its coefficients are '0' is distinguished. For example, when the cbp signal is (0, 0, 0. 1, 0, 1) for a macro block, blocks in which all of its coefficients are '0' are the first, second, third, and fifth blocks, whereas fourth and sixth blocks contain non-zero coefficients.

As described above, the zigzag scanning unit 3 detects the blocks having all zero coefficients to generate corresponding cbp signal. In the VLC unit 5, the obtained cbp signal and blocks are processed for further data compression.

In a conventional video encoder, the cbp signal and the (run, level) value of the coded block obtained are inputted to the VLC unit, however, the (run, level) value for block containing all zero DCT coefficients are not inputted. Consequently, the coded block is indistinguishable from the non-coded block.

SUMMARY OF THE INVENTION

In view of the foregoing, it is an object of the present invention to provide a run length encoder for outputting a (run, level) symbol when detecting a block in which all of its DCT coefficients are zero.

In order to achieve the above object, the present invention provides a run length encoder for encoding DCT coefficients obtained in a DCT, a quantization, and a scanning steps in block units to output an encoded (run, level) symbol, and outputting a predetermined (run, level) symbol if the obtained DCT coefficients of the block unit are all zero, the run length encoder, comprising a run length encoding core for receiving the DCT coefficients and outputting the (run, level) symbol;

a zero coefficient detector for detecting whether the DCT coefficients are '0' or not;

a zero block detector for receiving an output from the zero coefficient detector to detect whether all of the DCT coefficients of each block are '0' or not; and an output selector for selecting the 2-dimensional symbol outputted from the run length encoding core to output a (run, level) symbol or a predetermined (run, level) symbol, if the block determined in the zero block detector is non-zero or zero block, respectively.

BRIEF DESCRIPTION OF THE DRAWINGS

The above and other objects, features, and advantages of the present invention will be apparent from the following detailed description of the preferred embodiments of the invention in conjunction with the accompanying drawings, in which.

DESCRIPTION OF THE PREFERRED EMBODIMENT

Reference will now be made in detail to the present invention, examples of which are illustrated in the accompanying drawings. Wherever possible, the same reference numbers will be used throughout the drawings to refer to the same or like parts.

Figure 1:
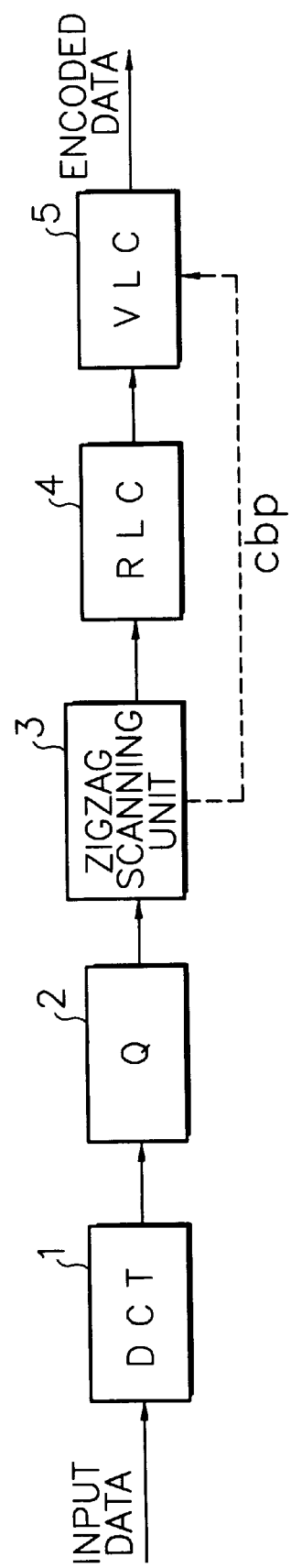
FIG. 1 is a schematic block diagram illustrating a conventional video encoder.

As shown in FIG. 1, a conventional video encoder comprises a DCT unit 1, a quantizer 2, a zigzag scanning unit 3, a RLC unit 4, VLC unit 5. In accordance with a preferred embodiment of the present invention, the zigzag scanning unit 3 scans quantized DCT coefficients in zigzag order and generates a cbp signal to be transferred to the VLC unit 5. The RLC unit 4 receives sequentially a couple of pixel and generates a (run, level) symbol and outputs it to the VLC unit 5.

Figure 2:
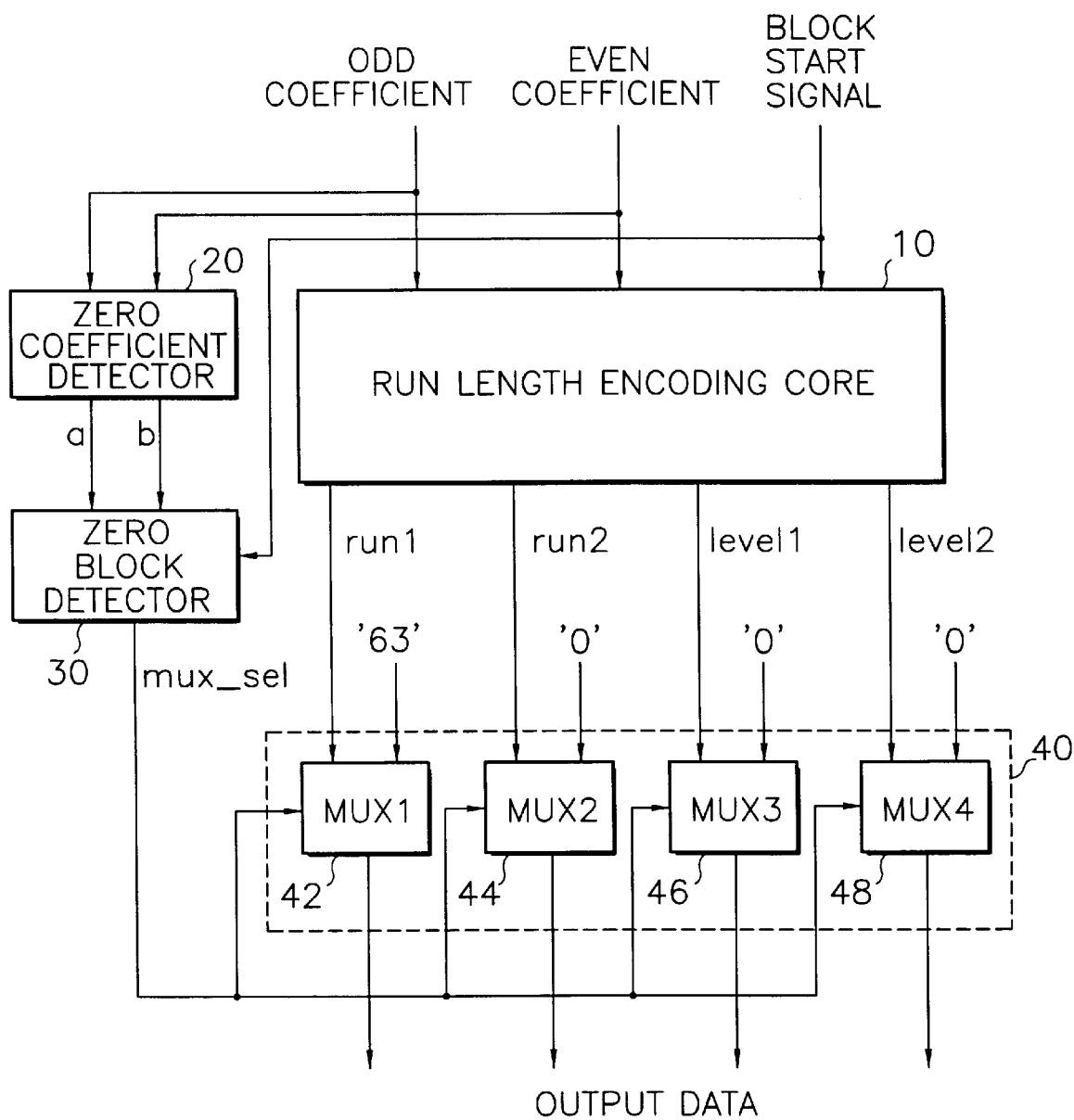
FIG. 2 is a schematic block diagram illustrating a run length encoder according to the present invention.

As shown in FIG. 2, the run length encoder of the present invention comprises a run length encoding core 10 for performing a conventional RLC, a zero coefficient detector 20, a zero block detector 30, and an output selector 40.

The run length encoding, core 10 receives an even and odd DCT coefficients in one system clock to increase a processing speed necessary for encoding the coefficients into a run length, thereby outputting a first (run, level) symbol and a second (run, level) symbol. At this time, the DCT coefficients are inputted in block units with a Block Start (BS) signal for representing a start of block. Each of blocks comprises 64 DCT coefficients.

The zero coefficient detector 20 receives simultaneously the DCT coefficients obtained in the DCT, the quantization, and the zigzag scanning steps, in two coefficients i.e., an even coefficient and an odd coefficient per each system clock, to yield a first detection signal a having '0' value when the odd coefficient is '0', whereas '1' value when the odd coefficient is not '0', and a second detection signal b having '0' value when the even coefficient is '0', whereas '1' value when the even coefficient is not '0'.

Figure 3:
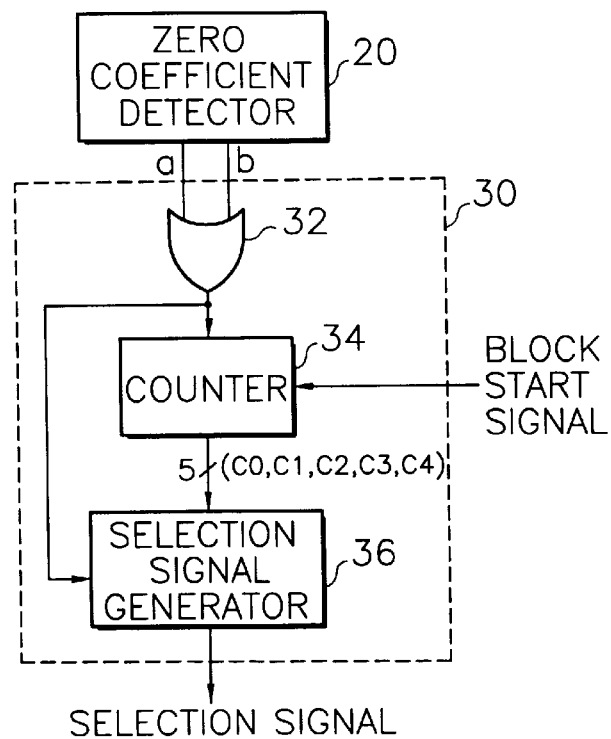
FIG. 3 is a detailed block diagram illustrating a zero block detector in FIG. 2.

The zero block detector 30, as shown in FIG. 3, comprises a logical OR (ate 32, a counter 34, and a selection signal generator 36. When all of the first and second detection signals (a, b) for a block are '0', the zero block detector 30 outputs a 'high' selection signal mux_sel for selecting a predetermined (run, level) symbol, once determining that the above block is a zero block.

The logical OR gate 32 performs the logical OR operation for the first and second detection signals (a, b) from the zero coefficient detector 20. The counter 34 is reset by the BS signal, counts '0' of the output from the logical OR gate 32 and out puts the count value. The selection signal generator 36 outputs a 'high' selection signal mux_sel when the count value from the counter 34 is '32'.

Figure 4:
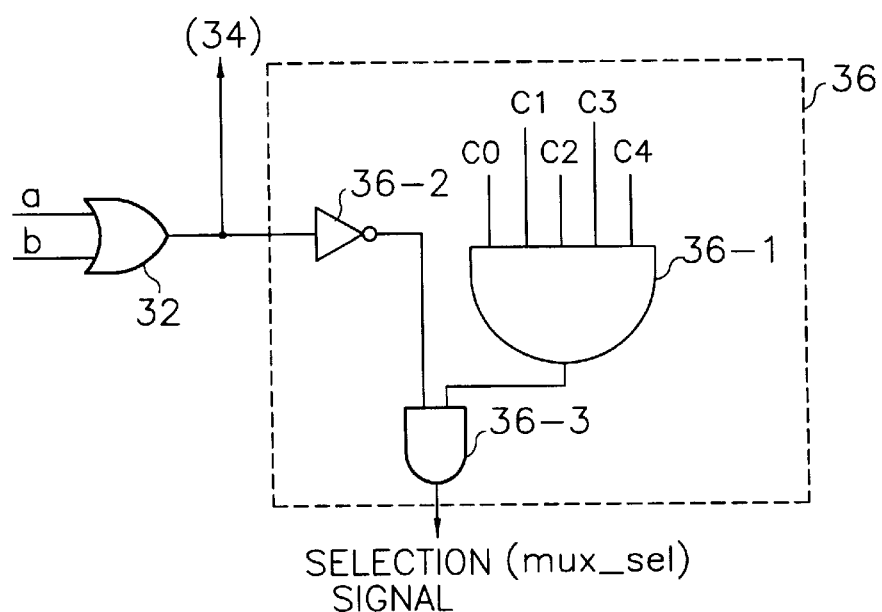
FIG. 4 is a circuit diagram of a selection signal generator illustrated in FIG. 3.

The selection signal generator 36, as shown in FIG. 4, may be embodied by the AND gates 36-1, 36-3 and an inverter 36-2. The AND gate 36-1 receives 5- bit count values C0, C1, C2, C3, and C4 from the counter 34 and performs the logical AND operation for each bit of the count values C0, C1, C2, C3, and C4 to output the selection signal mux_sel.

Referring to FIG. 2, the output selector 40 selects and outputs 2-dimensional symbols, (run1, level1) and (run2, level2) from the zero block detector 30 when the selection signal mux_sel from the zero block detector 30 is 'low', whereas 2-dimensional symbols, (63, 0) and (0, 0) are selected and outputted when the selection signal mux_sel from the zero block detector 30 is 'high'.

Namely, the output selector 40 comprises a first, second, third, fourth multiplexers 42, 44, 46, and 48, respectively. The first multiplexer 42 outputs '63' when the selection signal mux_sel is 'high', and a first run value run1 when the selection signal mux_sel is 'low'. The second multiplexer 44 outputs '0' when the selection signal mux_sel is 'high', and a second run value run2 when the selection signal mux_sel is 'low'. The third multiplexer 46 outputs '0' when the selection signal mux_sel is 'high', and a first level value level1 when the selection signal mux_sel is 'low'. The fourth multiplexer 48 outputs '0' when the selection signal mux_sel is 'high', and a second level value level2 when the selection signal mux_sel is 'low'.

Figure 6:
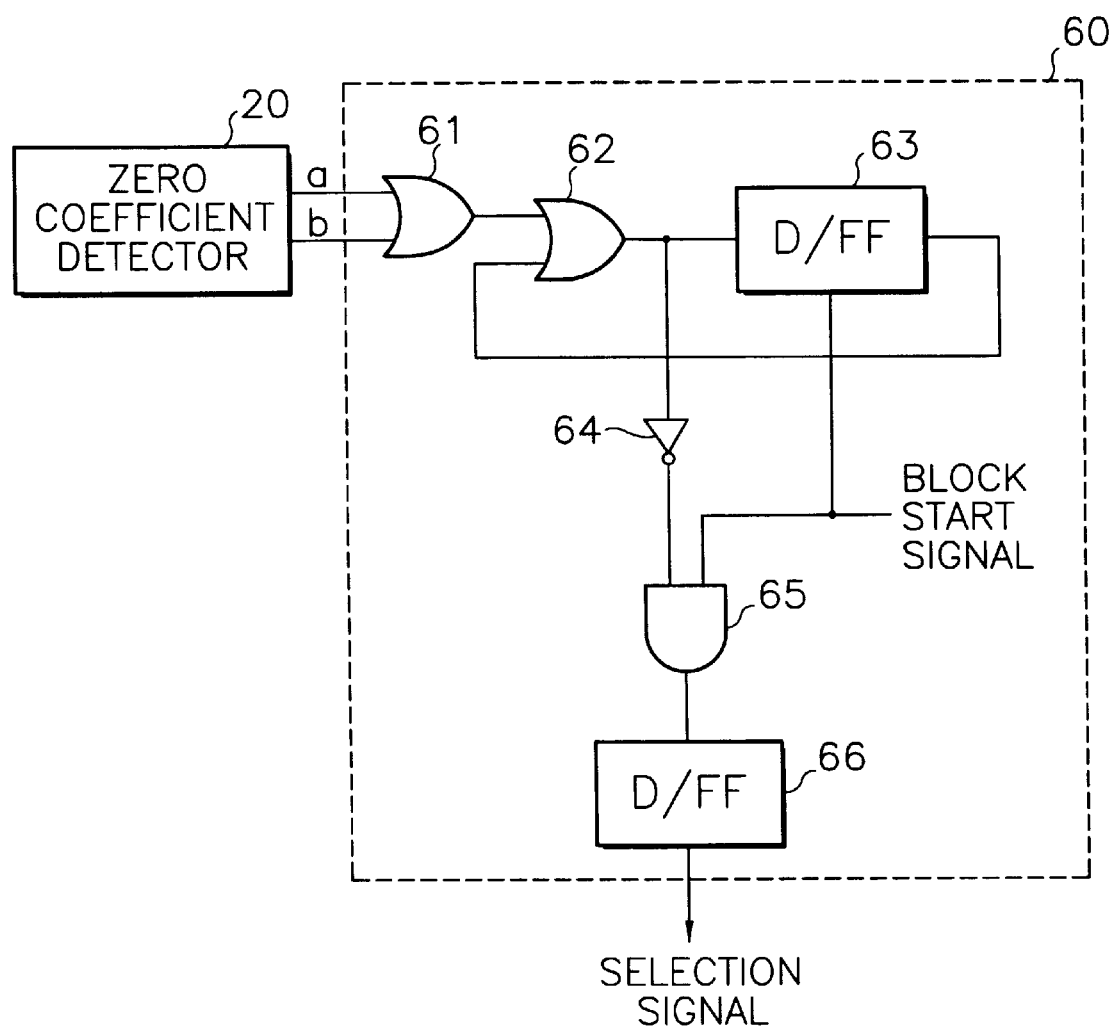
FIG. 6 is a detailed block diagram illustrating another preferred embodiment of the zero block detector in FIG. 2.

A zero block detector 60, as shown in FIG. 6, may comprise a first logical OR gate 61, a second logical OR gate 62, a first D-flip-flop 63, an inverter 64, a logical AND gate 65, and a second D-flip-flop 66.

Referring to FIG. 6, the first logical OR gate 61 performs a logical OR operation for the first and second detection signals (a, b) from the zero coefficient detector 20. The second logical OR gate 62 performs the logical OR operation for an output signal from the first logical OR gate 61 and a feedback signal. The first D-flip-flop 63 latches the output signal from the second logical OR gate 62, and feeds it back to the second logical OR gate 62. Additionally, the first D-flip-flop 63 is reset by the BS signal. The inverter 64 inverts an output signal from the second logical OR gate 62. The logical AND gate 65 performs the logical AND operation for an inverted signal from the inverter 64 and the BS signal. The second D-flip-flop 66 latches an output signal from the logical AND gate 65 to be outputted as the selection signal mux_sel.

Having described above the structure of the run length encoder of the present invention, the operation of the run length encoder will be discussed in detail.

The run length encoding core 10 receives the DCT coefficients obtained in the DCT, the quantization, and the scanning steps in two coefficients i.e., an even coefficient and an odd coefficient per each system clock, simultaneously, to encode in a run length and generates the 2-dimensional symbols, (run1, level1) and (run2, level2), which are outputted to the output selector 40.

The zero coefficient detector 20 simultaneously receives two DCT coefficients, to output a first detection signal a having '0' value when the odd coefficient is '0', whereas outputting '1' value when the odd coefficient is not '0', and a second detection signal b having '0' value when the even coefficient is '0', whereas outputting '1' value when the even coefficient is not '0' to the logical OR gate 32 of the zero block detector 30.

Figure 5:
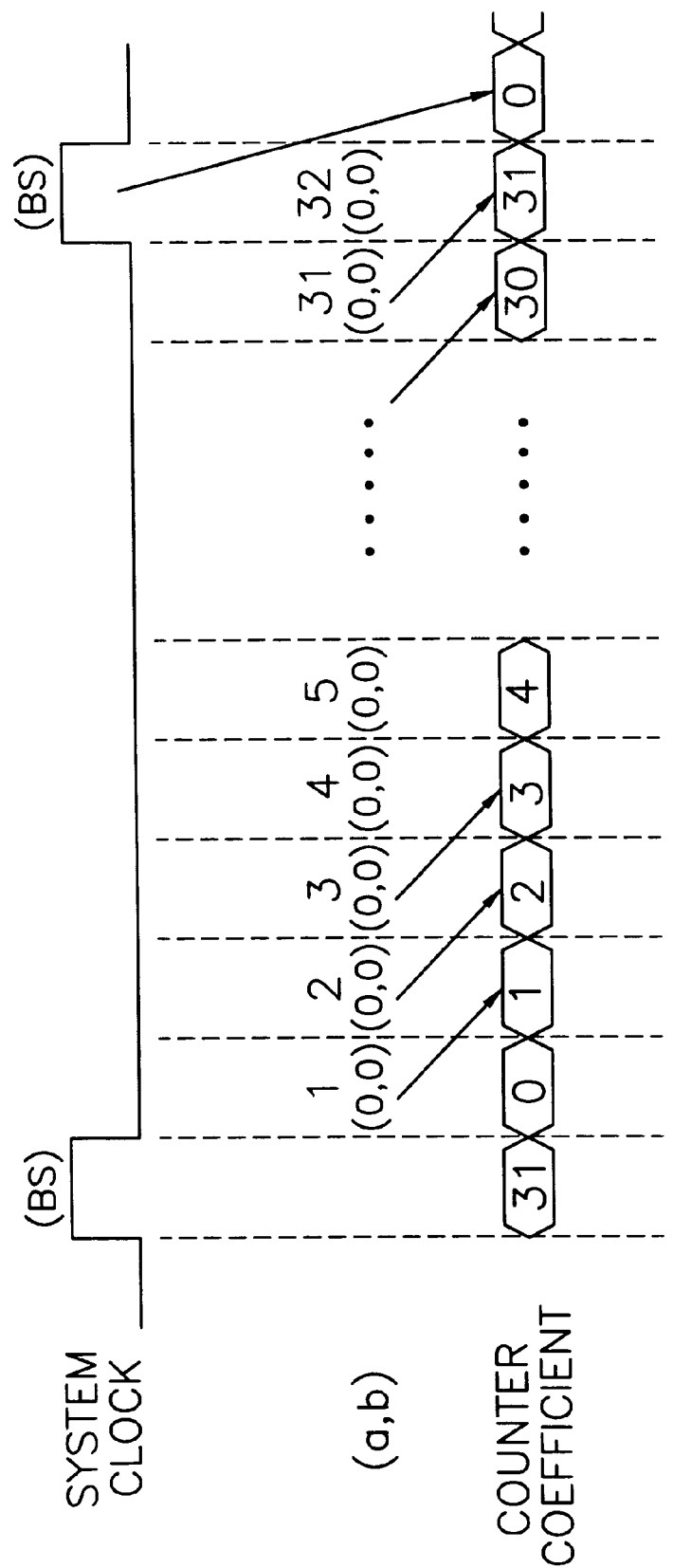
FIG. 5 is an operation timing diagram of a counter illustrated in FIG. 3.

The zero block detector 30 outputs the 'high' selection signal mux_sel to the output selector 40 when all the first and second detection signals (a, b) from the zero coefficient detector 20 are '0'. Namely, as shown in FIG. 3, the logical OR gate 32 of the zero block detector 30 performs the logical OR operation for the first and second detection signals (a, b). The counter 34 counts the '0' output values from the logical OR gate 32. Referring to FIG. 5, after the counter 34 is reset by the BS signal, the zero block is determined when '0's of the first and second detection signals (a, b) are counted and the count value becomes '32' during 32 system clocks.

Referring to FIG. 3, in the selection signal generator 36, when the count value from the counter 34 is '32', the 'high' selection signal mux_sel is outputted to each multiplexers 42, 44, 46, and 48 of the output selector 40. Namely, as shown in detail in FIG. 4, the logical AND operation for 5 bit count values C0, C1, C2, C3, and C4 from the counter 34 is performed to output the selection signal mux_sel. For example, if the 5 bit count values from the counter 34 is (1, 1, 1, 1, 1) when the count value is '32', the 'high' selection signal is outputted after performing the logical AND operation for the 5 bit count values.

According to another embodiment of the zero block detector 60 of the present invention, as shown in FIG. 6, the 'high' selection signal mux_sel is outputted to the output selector 40 when all of the first and second detection signals (a, b) are '0'. Namely, in the first logical OR gate 61 of the zero block detector 60, the logical OR operation for the first and second detection signals (a, b) from the zero coefficient detector 20 is performed. In the second logical OR gate 62, the logical OR operation for the output signal from the first logical OR gate 61 and the feedback signal from the first D-flip-flop 63 is performed.

In the first D-flip-flop 63, the output signal from the second logical OR gate 62 is latched and fed back to the second logical OR gate 62. In the inverter 64, the output signal from the second logical OR gate 62 is inverted and fed back to the second logical OR gate 62. At this time, the first D-flip-flop 63 is reset by the BS signal, and the '0', is outputted from the second logical OR gate 62, when all of the first and second detection signals (a, b) from the zero coefficient detector 20 are '0'. On the contrary, when all of the first and second detection signals (a, b) are '1', the '1' is outputted from the second logical OR gate 62 until the next block is started.

In the inverter 64, the output signal from the second logical OR gate 62 is inverted. In the logical AND gate 65, the logical AND operation for the inverted signal from the inverter 64 and the BS signal is performed. Namely, if the output signal from the second logical OR gate 62 is '0' when the BS signal is '1', then the logical AND gate 65 outputs '1' since the inverter output is '1'. Accordingly, the logical AND gate 65 outputs the 'high' signal when all of the first and second detection signals (a, b) are '0'.

The second D-flip-flop 66 latches the output signal from the logical AND gate 65 to output the 'high' selection signal mux_sel to each multiplexer 42, 44, 46, and 48 of the output selector 40. Here, the second D-flip-flop 66 prevents a temporal collision between the selection signal mux_sel and the EOB signal by delaying one clock for the output signal from the logical AND gate 65.

The first multiplexer 42 of the output selector 40 outputs '63' when the selection signal mux set is 'high', whereas it outputs the first run value run1 when the selection signal mux_sel is 'low'. The second multiplexer 44 outputs '0' when the selection signal mux_sel is 'high', whereas it outputs the second run value run2 when the selection signal mux_sel is 'low'. The third multiplexer 46 outputs '0' when the selection signal mux_sel is 'high', whereas it outputs the first level value level1 when the selection signal mux_sel is 'low'. The fourth multiplexer 48 of the output selector 40 outputs '0' when the selection signal mux_sel is 'high', whereas it outputs the second level value level2 when the selection signal mux_sel is 'low'.

Accordingly, the output selector 40 selects and outputs the 2-dimensional symbols outputted from the run length encoding core 10, (run1, level1) and (run2, level2) when the selection signal mux_sel from the zero block detector 30 is 'low', whereas it outputs the 2-dimensional symbols, (63, 0) and (0, 0) when the selection signal mux_sel is 'high'.

As described above, the run length encoder of the present invention outputs the predetermined (run, level) symbol to the VLC unit, when detecting the zero block in which all of its DCT coefficients obtained in the DCT, the quantization and the scanning steps are '0'. Accordingly, the run length encoder provides an accurate video encoding.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A run length encoder for encoding DCT coefficients obtained in a DCT, a quantization, and scanning steps in block units to output an encoded (run, level) symbol, and outputting a predetermined (run, level) symbol if the obtained DCT coefficients in the block unit are all zero, the run length encoder comprising:

a run length encoding core for receiving the DCT coefficients and outputting the encoded (run, level) symbol;

a zero coefficient detecting means for detecting whether the DCT coefficients are '0' or not;

a zero block detecting means for receiving an output from said zero coefficient detecting means to detect whether all of the DCT coefficients of each block are '0' or not; and an output selecting means for selectively outputting the encoded (run, level) symbol outputted from said run length encoding core and the predetermined (run, level) symbol according to the detected result of the zero block detecting means, wherein said zero block detecting means comprises:
a first logical OR gate for performing a logical OR operation for the first and second detection signals;
a second logical OR gate for performing a logical OR operation for an output signal from said first logical OR gate and a feedback signal;
a first D-flip-flop, being reset by a BS signal, for latching an output signal from said second logical OR gate to be provided to said second logical OR gate as the feedback signal;
an inverter for inverting the output signal from said second logical OR gate;
a logical AND gate for performing a logical AND operation for an inverted signal from said inverter and the BS signal; and
a second D-flip-flop for latching an output signal form said logical AND gate and outputting a selection signal to said output selecting means.

2. The run length encoder of claim 1, wherein said output selecting means comprises:
a first multiplexer for outputting '63' when the selection signal is 'high', and outputting a first run value when the selection signal is 'low';
a second multiplexer for outputting '0' when the selection signal is 'high', and outputting a second run value when the selection signal is 'low';
a third multiplexer for outputting '0' when the selection signal is 'high', and outputting a first level value when the selection signal is 'low', and
a fourth multiplexer for outputting '0' when the selection signal is 'high', and outputting a second level value when the selection signal is 'low'.

* * * * *